United States Patent
Zufall

(10) Patent No.: US 12,396,021 B2
(45) Date of Patent: Aug. 19, 2025

(54) 5G PRB BLANKING SYSTEM WITH 5G PHONE TO PREVENT INTERFERENCE WITH SATELLITE SIGNAL TRANSMISSION

(71) Applicant: DISH Wireless L.L.C., Englewood, CO (US)

(72) Inventor: David Zufall, Lone Tree, CO (US)

(73) Assignee: DISH Wireless L.L.C., Englewood, CO (US)

( * ) Notice: Subject to any disclaimer, the term of this patent is extended or adjusted under 35 U.S.C. 154(b) by 339 days.

(21) Appl. No.: 18/189,981

(22) Filed: Mar. 24, 2023

(65) Prior Publication Data

US 2024/0056239 A1 Feb. 15, 2024

Related U.S. Application Data

(60) Provisional application No. 63/396,511, filed on Aug. 9, 2022.

(51) Int. Cl.
*H04W 72/541* (2023.01)
*H04B 7/185* (2006.01)
(Continued)

(52) U.S. Cl.
CPC ........ *H04W 72/541* (2023.01); *H04B 7/1851* (2013.01); *H04B 7/1853* (2013.01); *H04L 5/0007* (2013.01); *H04W 72/0446* (2013.01); *H04W 72/1268* (2013.01); *H04W 84/06* (2013.01)

(58) Field of Classification Search
CPC .. H04B 5/0073; H04B 7/1851; H04B 7/1853; H04L 5/0007; H04W 16/14; H04W 72/0446; H04W 72/1268; H04W 72/54; H04W 72/541; H04W 84/06; H04W 88/085
See application file for complete search history.

(56) References Cited

U.S. PATENT DOCUMENTS 12,196,865 B2 * 1/2025 Cookman ............. H04K 3/224
2016/0270089 A1 9/2016 Olfat et al.
(Continued)

OTHER PUBLICATIONS

"3rd Generation Partnership Project; Technical Specification Group Radio Access Network; NG-RAN; Architecture description (Release 16)," Technical Specification, 3GPP TS 38.401 V16.8.0, Dec. 2021, 79 pages.

*Primary Examiner* — Thomas R Cairns
(74) *Attorney, Agent, or Firm* — Seed Intellectual Property Law Group LLP

(57) ABSTRACT

Embodiments are directed towards systems and methods for a 5G PRB blanking system with 5G end user mobile devices to prevent interference with satellite signal transmission. One such method includes: configuring a 5G network to enable reversing an original direction of transmission upon request from a 5G end user mobile device; receiving a request to use a specified frequency at a specified time to communicate with the satellite; enabling the base station to stop download transmissions on specified frequency tones at the specified time; creating frequency notches at the specified time that are available for a 5G end user mobile device to upload to the satellite; and facilitating upload transmissions from a 5G end user mobile device to the satellite in the frequency notches at the specified time.

20 Claims, 7 Drawing Sheets

(51) Int. Cl.
     *H04L 5/00*          (2006.01)
     *H04W 72/0446*    (2023.01)
     *H04W 72/1268*    (2023.01)
     *H04W 84/06*      (2009.01)

(56)             References Cited

U.S. PATENT DOCUMENTS

| | | |
|---|---|---|
| 2019/0082491 A1 | 3/2019 | Shelby et al. |
| 2019/0089498 A1* | 3/2019 | Pelletier .................. H04L 5/005 |
| 2022/0086844 A1 | 3/2022 | Rassam et al. |
| 2023/0067492 A1 | 3/2023 | Pattar et al. |
| 2023/0155862 A1 | 5/2023 | Dharwadkar et al. |
| 2023/0180016 A1 | 6/2023 | Mody et al. |

* cited by examiner

5G PRB BLANKING SYSTEM WITH 5G PHONE TO PREVENT INTERFERENCE WITH SATELLITE SIGNAL TRANSMISSION

BACKGROUND

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

In some types of 5G network architecture, multiple 5G Cores are connected to a central database that manages subscriber information. During operation of the 5G network, there may be occasions when a 5G end user mobile device wants to transmit information to the satellite. This can be problematic because typically the satellite is transmitting information downward to the 5G network components. Thus, attempts by a 5G end user mobile device would typically result in interference. Such interference would be problematic for both the downward transmissions and the upward transmissions. However, an actual solution to this problem that has yet to be produced. The present disclosure addresses this and other issues.

BRIEF SUMMARY

The present disclosure relates generally to telecommunication networks, more particularly, to a 5G Physical Resource Block (PRB) blanking system with 5G end user mobile devices to prevent interference with satellite signal transmission.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called microservices.

Briefly stated, one or more methods for 5G Physical Resource Block (PRB) blanking system with 5G end user mobile devices to prevent interference with satellite signal transmission are disclosed. Some such methods include: providing, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; configuring a 5G network to enable reversing an original direction of transmission upon request from a 5G end user mobile device, wherein the original direction of transmission is from the satellite to a 5G Core to a 5G base station to a 5G end user mobile device; receiving a request to use a specified frequency at a specified time to communicate with the satellite; enabling the base station to stop download transmissions on specified frequency tones at the specified time; creating frequency notches at the specified time that are available for a 5G end user mobile device to upload to the satellite; and facilitating upload transmissions from a 5G end user mobile device to the satellite in the frequency notches at the specified time.

In some embodiments of the methods for a 5G PRB blanking system with 5G end user mobile devices to prevent interference with satellite signal transmission, the method further includes connecting an individual 5G end user mobile device to an associated 5G Core using an IMSI (International Mobile Subscriber Identifier) number. In another aspect of some embodiments, the system further includes providing a Unified Data Management system that includes a Distributed Subscriber Database and connects to a plurality of 5G Cores, wherein each 5G Core in turn connects to the primary gNB, and wherein the primary gNB in turn connects to a plurality of individual 5G end user mobile devices. In still another aspect of some embodiments, the receiving of the request to use the specified frequency at the specified time to communicate with the satellite is made by a 5G Core, a 5G base station, or a 5G end user mobile device. In yet another aspect of some embodiments, the system further includes requesting a base station in the primary gNB to reverse a direction of transmission. Also, in one or more aspects of some embodiments, the system further includes providing dynamic 5G PRB blanking reconfiguration of frequency notches. Furthermore, in some embodiments, the primary gNB configures Bandwidth Parts to optimize the 5G network for the frequency notches used for the 5G end user mobile device to upload to the satellite.

In other embodiments, one or more systems for 5G Physical Resource Block (PRB) blanking system with 5G end user mobile devices to prevent interference with satellite signal transmission are disclosed. The system includes: a memory that stores computer executable instructions; and a processor that executes the computer executable instructions to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; configure a 5G network to enable reversing an original direction of transmission upon request from a 5G end user mobile device, wherein the original direction of transmission is from the satellite to a 5G Core to a 5G base station to a 5G end user mobile device; receive a request to use a specified frequency at a specified time to communicate with the satellite; enable the base station to stop download transmissions on specified frequency tones at the specified time; create frequency notches at the specified time that are available for a 5G end user mobile device to upload to the satellite; and facilitate upload transmissions from a 5G end user mobile device to the satellite in the frequency notches at the specified time.

In some embodiments of the system for a 5G PRB blanking system with 5G end user mobile devices to prevent interference with satellite signal transmission, the system further includes connecting an individual 5G end user mobile device to an associated 5G Core using an IMSI (International Mobile Subscriber Identifier) number. In another aspect of some embodiments, the system further includes providing a Unified Data Management system that includes a Distributed Subscriber Database and connects to a plurality of 5G Cores, wherein each 5G Core in turn connects to the primary gNB, and wherein the primary gNB in turn connects to a plurality of individual 5G end user mobile devices. In still another aspect of some embodiments, the receiving of the request to use the specified frequency at the specified time to communicate with the satellite is made by a 5G Core, a 5G base station, or a 5G end user mobile device. In yet another aspect of some embodiments, the processor that executes the computer-executable instructions further causes the processor to: request a base station in the primary gNB to reverse a direction of transmission. Also, in one or more aspects of some embodiments, the system includes dynamic 5G PRB blanking reconfiguration of frequency notches. Furthermore, in some embodiments, the primary gNB configures Bandwidth Parts to optimize the 5G network for the frequency notches used for the 5G end user mobile device to upload to the satellite.

Additionally, in other embodiments, one or more non-transitory computer-readable storage mediums are disclosed. The one or more non-transitory computer-readable storage mediums have computer-executable instructions stored thereon that, when executed by a processor, cause the processor to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a primary 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; configuring a 5G network to enable reversing an original direction of transmission upon request from a 5G end user mobile device, wherein the original direction of transmission is from the satellite to a 5G Core to a 5G base station to a 5G end user mobile device; requesting to use a specified frequency at a specified time to communicate with the satellite; enabling the base station to stop download transmissions on specified frequency tones at the specified time; creating frequency notches at the specified time that are available for a 5G end user mobile device to upload to the satellite; and facilitating upload transmissions from a 5G end user mobile device to the satellite in the specified notches at the specified time.

In some embodiments, the computer-executable instructions, when executed by a processor, further cause the processor to: connect an individual 5G end user mobile device to an associated 5G Core using an IMSI (International Mobile Subscriber Identifier) number. In another aspect of some embodiments, the computer-executable instructions, when executed by a processor, further cause the processor to: provide a Unified Data Management system that includes a Distributed Subscriber Database and connects to a plurality of 5G Cores, wherein each 5G Core in turn connects to the primary gNB, and wherein the primary gNB in turn connects to a plurality of individual 5G end user mobile devices. In still another aspect of some embodiments, the computer-executable instructions, when executed by a processor, further cause the processor to: request a base station in the primary gNB to reverse a direction of transmission. In yet another aspect of some embodiments, the system further includes dynamic 5G PRB blanking reconfiguration of frequency notches. Furthermore, in some embodiments, the primary gNB configures Bandwidth Parts to optimize the 5G network for the frequency notches used for the 5G end user mobile device to upload to the satellite.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
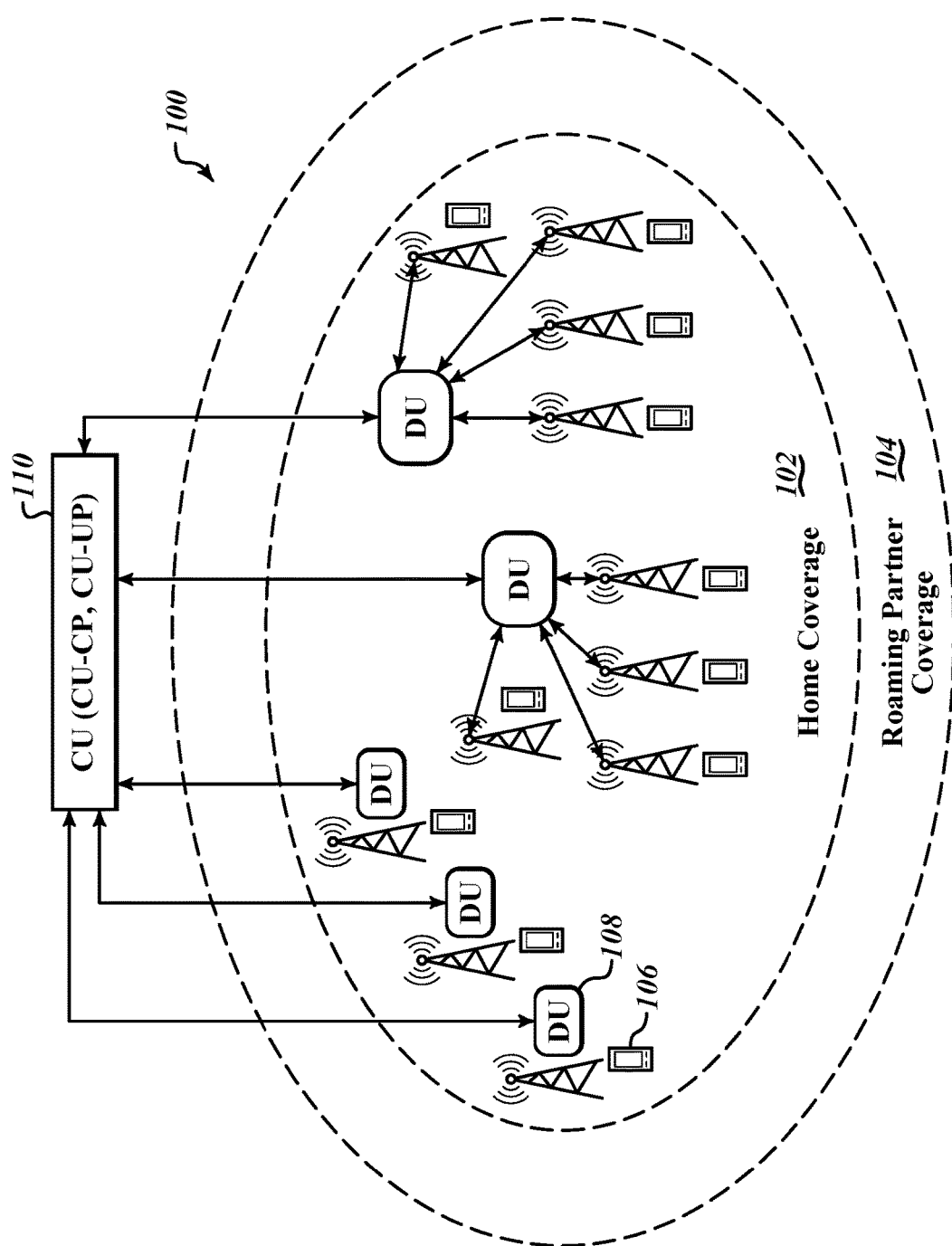
FIG. 1 illustrates a context diagram of an environment in which a system for a 5G PRB blanking system with 5G end user mobile devices to prevent interference with satellite signal transmission may be implemented in accordance with embodiments described herein.

FIG. 1 illustrates a context diagram of an environment for a 5G Physical Resource Block (PRB) blanking system with 5G end user mobile devices to prevent interference with satellite signal transmission may be implemented in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
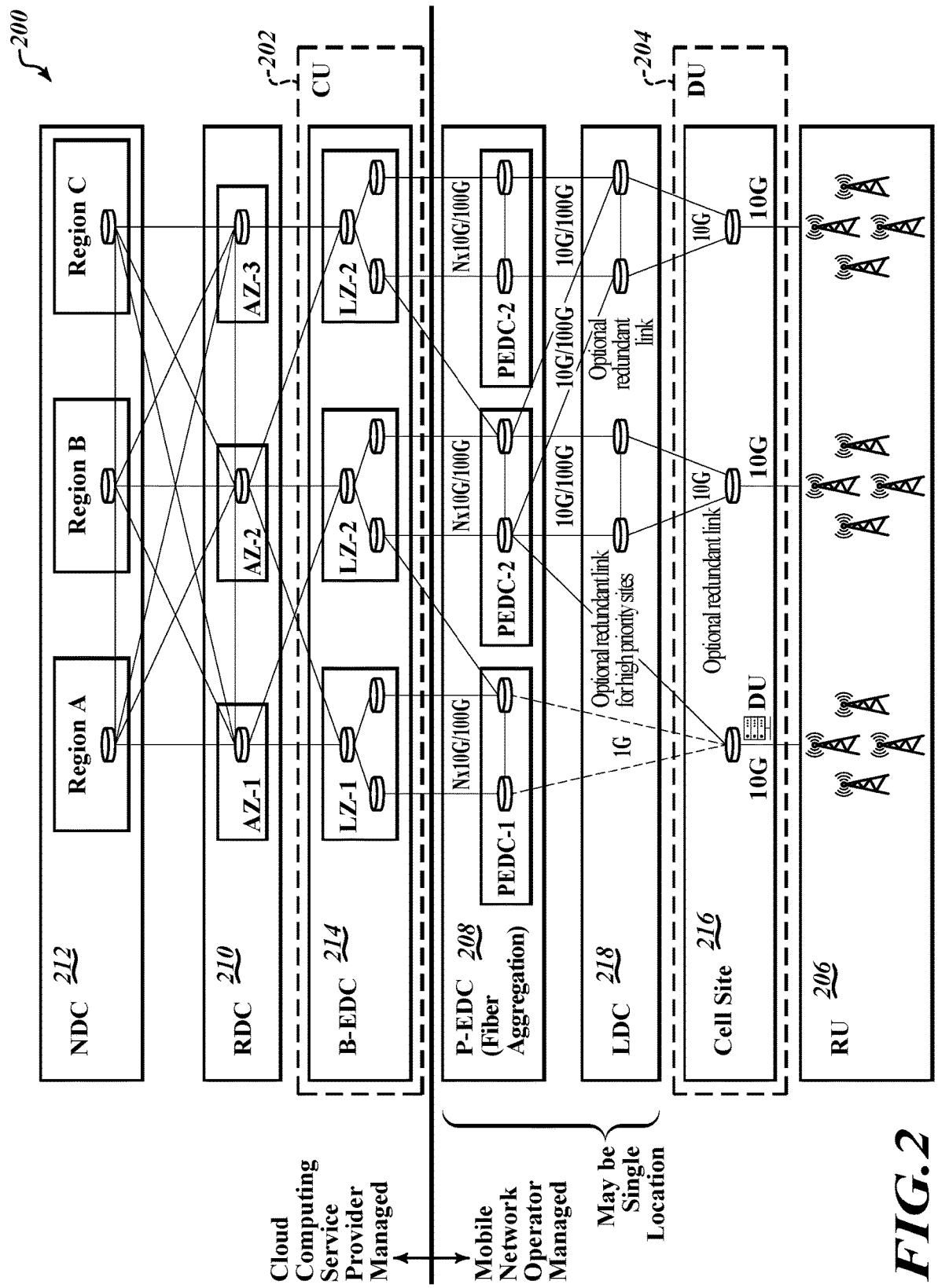
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP), respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
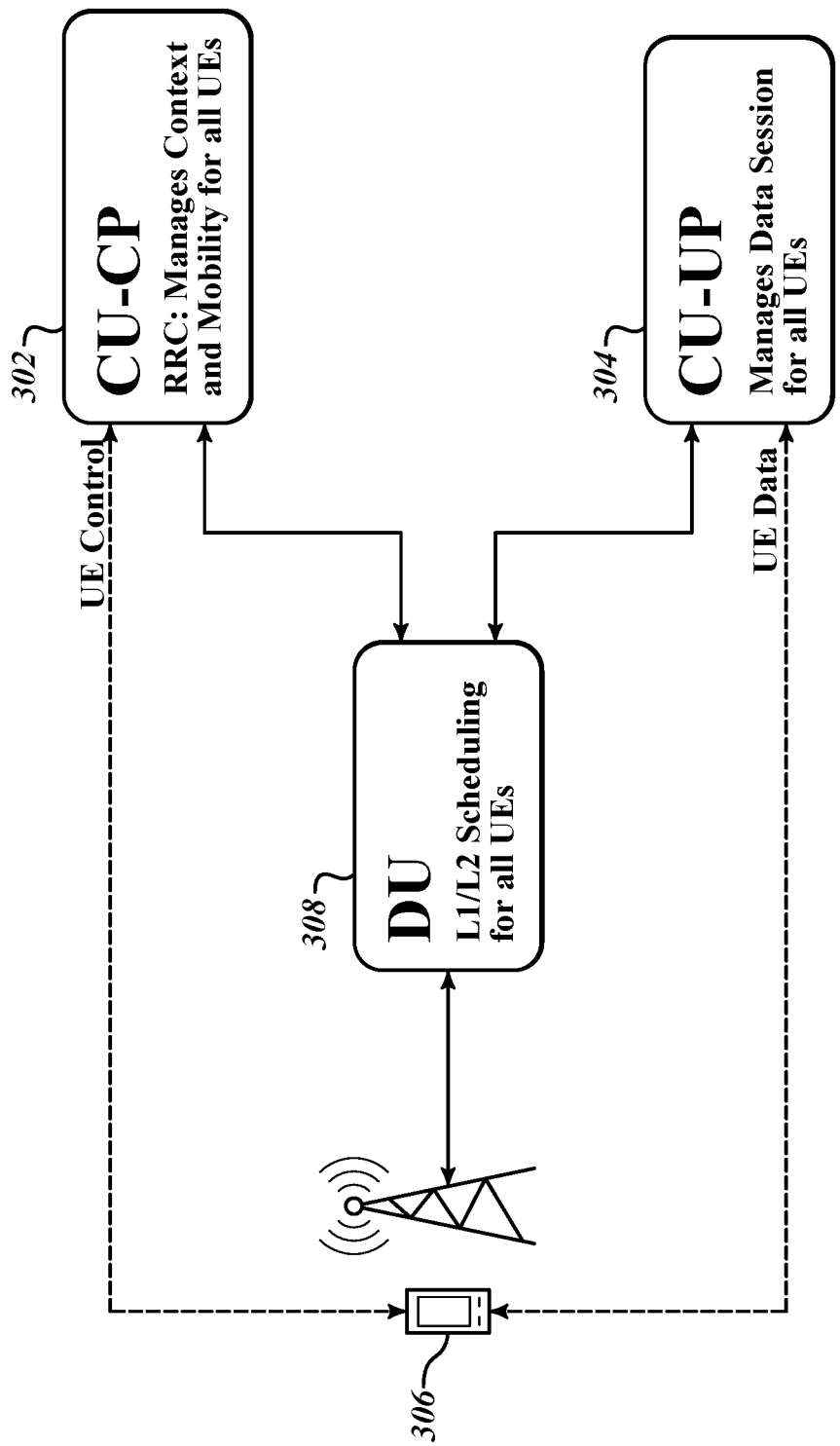
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP), for example of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Passthrough Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the 5G PRB blanking system with 5G end user mobile devices to prevent interference with satellite signal transmission, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Figure 4:
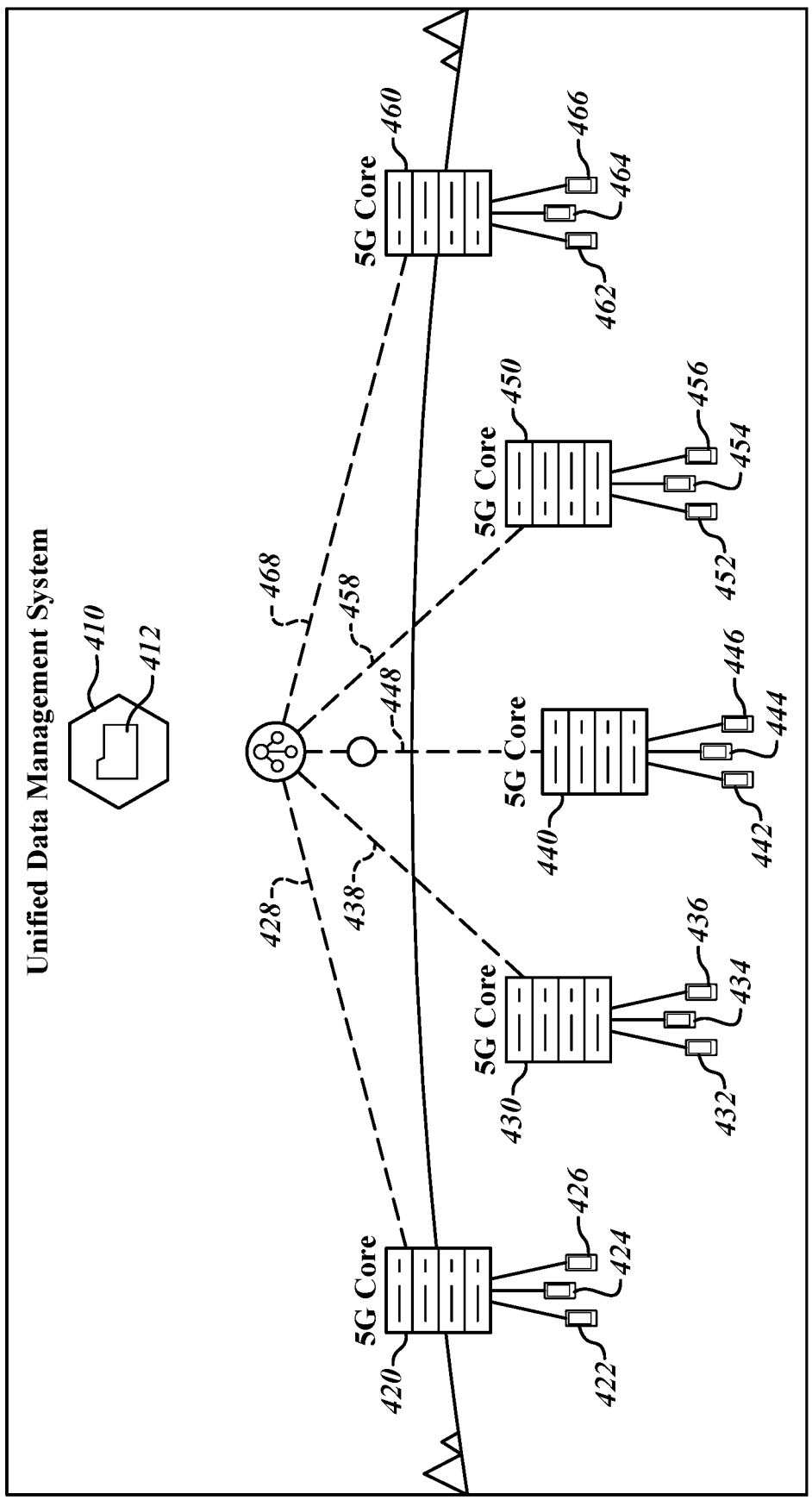
FIG. 4 illustrates a system that includes a central distributed subscriber database, a plurality of connected 5G Cores, and a plurality of mobile end user devices connected to each 5G Core.

FIG. 4 illustrates a 5G PRB blanking system with 5G end user mobile devices to prevent interference with satellite signal transmission that includes a Unified Data Management System 410, central distributed subscriber database 412, a plurality of connected 5G Cores 420, 430, 440, 450, and 460, and a plurality of mobile end user devices 422, 424, 426, 432, 434, 436, 442, 444, 446, 452, 454, 456, 462, 464, and 466. The central distributed subscriber database 412 is contained in the Unified Data Management System 410. The plurality of connected 5G Cores 420, 430, 440, 450, and 460 are each connected to the central distributed subscriber database 412 by connection lines 428, 438, 448, 458, and 468. The connection lines 428, 438, 448, 458, and 468 transmit voice and data information as well as control information, between the central distributed subscriber database 412 and the plurality of connected 5G Cores 420, 430, 440, 450, and 460. Additionally, the plurality of mobile end user devices 422, 424, 426, 432, 434, 436, 442, 444, 446, 452, 454, 456, 462, 464, and 466 are each connected to their respective 5G Cores 420, 430, 440, 450, and 460. In some embodiments this is a direct connection, while in other embodiments, there are additional telephony components (e.g., base stations, antennas, receivers, and the like) that bridge the connection between the plurality of mobile end user devices 422, 424, 426, 432, 434, 436, 442, 444, 446, 452, 454, 456, 462, 464, and 466 that are each connected to their respective 5G Cores 420, 430, 440, 450, and 460.

Figure 5:
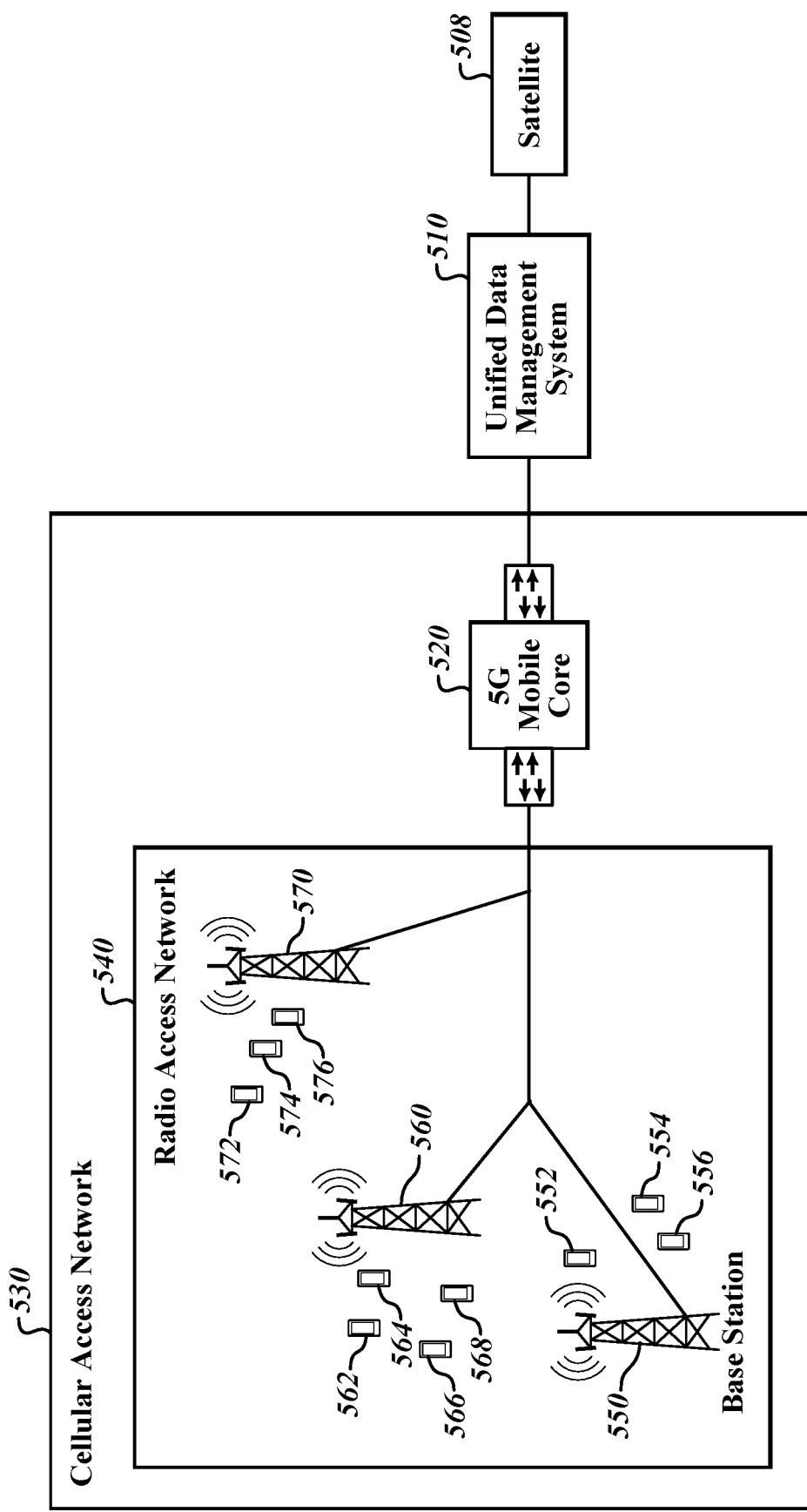
FIG. 5 illustrates a system that includes a satellite, Unified Data Management system, one or more connected 5G Cores, a plurality of base stations, and a plurality of mobile end user devices.

Referring now to FIG. 5, some embodiments of a 5G network architecture include a satellite 508, a Unified Data Management System 510, one or more 5G Cores 520, a Cellular Access Network 530, a 5G Radio Access Network 540, a plurality of Base Stations 550, 560, 570, and a plurality of 5G End User Mobile Devices 552, 554, 556, 562, 564, 566, 568, 572 574, and 576. As described above (and shown in FIG. 1), the 5G RAN is split into DUs (e.g., DU 108) that manage scheduling of all the users, and a CU that manages the mobility and radio resource control (RRC) state for all the UEs. Referring again to FIG. 5, the 5G RAN 540 corresponds to a distributed collection of Base Stations 550, 560, 570. As noted above, in 5G architecture the distributed collection of Base Stations 550, 560, 570 may be referred to as gNB.

The 5G Core 520 (which is sometimes referred to as a Next Generation Core) includes several functionalities that serves several purposes. Such functionalities include connectivity for data and voice services, ensuring uninterrupted service for users of the 5G end user mobile devices 552, 554, 556, 562, 564, 566, 568, 572, 574, and 576, and billing services. As shown in FIG. 5, the 5G Core 520 is part of the architecture of the 5G cellular access network 530. The 5G Core 520 provides an access bridge between the 5G RAN 540 and the Unified Data Management System 510, which in turn is in communication with the satellite 508. In some embodiments of the 5G PRB blanking system, each 5G Core 520 services a specific geographically area, such as a city or portion of a metropolitan area. While not shown in FIG. 5, the associated 5G RAN 540 could service dozens or hundreds of Base Stations 550, 560, 570.

In one or more embodiments, a 5G PRB blanking system with 5G end user mobile devices is disclosed. Such system and methods prevent interference with satellite signal transmission due to the 5G PRB blanking system. Typically, the satellite 508 sends a transmission to the Unified Data Management System 510, which in turn forwards information to the one or more 5G Cores 520, which again in turn forwards information to the plurality of Base Stations 550, 560, 570, and finally to an 5G end user mobile device. In some embodiments, the 5G PRB blanking system configures a 5G network to enable reversing an original direction of transmission upon request from a 5G end user mobile device.

In another aspect of the 5G PRB blanking system, the system receives a request to use a specified frequency at a specified time to communicate with the satellite 508. The 5G PRB blanking system also enables the Base Stations 550, 560, 570 to stop downloading transmissions on specified frequency tones at the specified time. Next, in response to the request, the 5G PRB blanking system creates frequency notches at the specified time that are available for a 5G end user mobile device 552 to upload to the satellite 508. Additionally, the 5G PRB blanking system facilitates upload transmissions from a 5G end user mobile device 552 to the satellite 508 in the frequency notches at the specified time.

In some embodiments of the 5G PRB blanking system, the receiving of the request to use the specified frequency at the specified time to communicate with the satellite 508 is made by a 5G Core 520, a 5G base station 550, or a 5G end user mobile device 552. In another aspect of some embodiments, the 5G PRB blanking system requests a Base Stations 550, 560, or 570 in the primary gNB to reverse a direction of transmission.

In other embodiments of the 5G PRB blanking system, the system provides dynamic 5G PRB blanking reconfiguration of frequency notches. Furthermore, in some embodiments of the 5G PRB blanking system, the primary gNB configures Bandwidth Parts to optimize the 5G network for the frequency notches used for the 5G end user mobile device 552 to upload to the satellite 508. In some embodiments, min-slots may be used to improve scheduling and reduce latency. For example, the gNB may schedule mini-slot-based transmissions in the Uplink Pilot Time Slot (UpPTS) region of a subframe.

A functionality in 5G New Radio (NR) is a feature known as bandwidth parts (BWPs). A Bandwidth Part (BWP) is a contiguous set of physical resource blocks (PRBs) on a given carrier. These resource blocks are selected from a contiguous subset of the common resource blocks. Typically, in a 5G environment, the entire available bandwidth is very large so the band may be broken up into parts for use by certain devices. For this reason, Bandwidth Parts may sometime be referred to as RAN slicing. Bandwidth Parts enable more flexibility in how resources are assigned in a given carrier. Specifically, multiple, different signal types may be sent in a given bandwidth. Most 5G Base Stations 550, 560, or 570 can utilize the wider bandwidths that are available in 5G. However, most 5G end user mobile device 552 are not be able to use the larger available bandwidths supported by the 5G Base Stations 550, 560, or 570. Bandwidth Parts enable multiplexing of different signals and signal types for better utilization of the spectrum and improved power utilization by the 5G end user mobile devices 552, 554, 556, 562, 564, 566, 568, 572, 574, and 576, as well as the optimizing of frequency notch scheduling for dynamic 5G PRB blanking.

Orthogonal Frequency Division Multiplexing (OFDM) is a modulation format that may be implemented for 5G New Radio in some embodiments. OFDM is an efficient modulation format used in modern wireless communication systems including 5G. OFDM combines the benefits of Quadrature Amplitude Modulation (QAM) and Frequency Division Multiplexing (FDM) to produce a high-data-rate communication system. By employing the OFDM modulation format, bandlimited orthogonal signals can be combined while avoiding interchannel interference. Notably, OFDM is enabled by the use of the Inverse Fast Fourier Transform (IFFT) to efficiently create the time domain waveform from the array of modulated subcarriers. Therefore, in some embodiments of the 5G PRB blanking, OFDM may be implemented to help prevent uplink signals of a 5G end user mobile device (or other uplink transmitting component) from interfering with downlink signals from a satellite 508 (or other downlink transmitting component).

Figure 6:
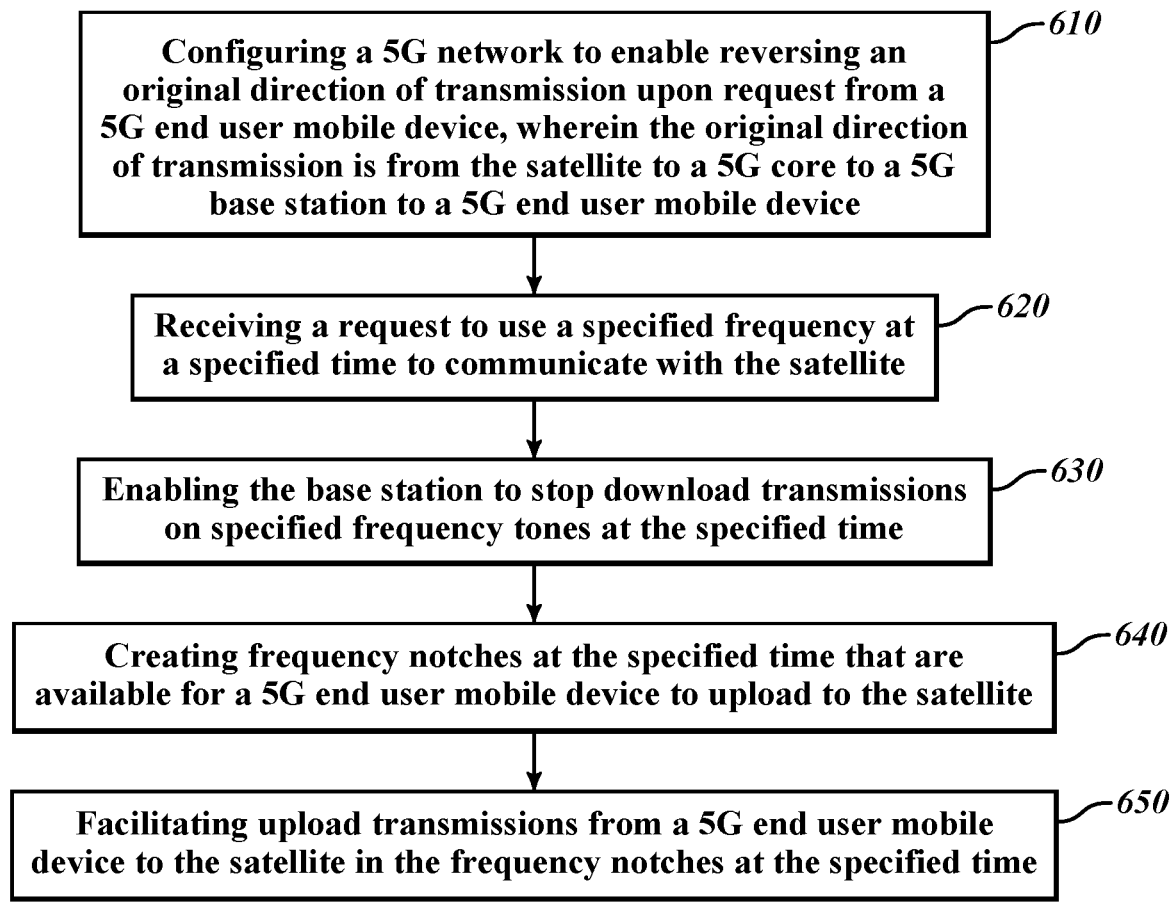
FIG. 6 is a logic diagram showing number sequencing data flow between certain telecommunication network components during 5G PRB blanking.

FIG. 6 is a logic diagram showing a 5G PRB blanking system with 5G end user mobile devices to prevent interference with satellite signal transmission. As shown in FIG. 6, at operation 610, a 5G network is configured to enable reversing an original direction of transmission upon request from a 5G end user mobile device, wherein the original direction of transmission is from the satellite to a 5G core to a 5G base station to a 5G end user mobile device. At operation 620, a request is received to use a specified frequency at a specified time to communicate with the satellite. At operation 630, the base station is enabled to stop download transmissions on specified frequency tones at the specified time. At operation 640, frequency notches are created at the specified time that are available for a 5G end user mobile device to upload to the satellite. At operation 650, upload transmissions are facilitated from a 5G end user mobile device to the satellite in the frequency notches at the specified time.

In some embodiments of a 5G PRB blanking system to prevent interference with satellite signal transmission, each individual mobile end user device 422, 424, 426, 432, 434, 436, 442, 444, 446, 452, 454, 456, 462, 464, and 466 is associated with its associated 5G Core 420, 430, 440, 450, and 460 using an IMSI (International Mobile Subscriber Identifier) number. An IMSI is a unique number associated with Global System for Mobile Communications (GSM) and Universal Mobile Telecommunications System (UMTS) network mobile phone users. As such, the IMSI is a unique number that identifies a mobile end user that is a subscriber to the carrier network.

In another aspect of some embodiments of the system, a mobile subscriber of each individual mobile end user device is identified by its SIM (Subscriber Identity Module) card. A SIM card is a smart card inside a mobile phone that includes an identification number that is unique to the owner of the mobile end user device. The SIM card may store personal data and prevent operation if it is removed. The SIM card may also include an authentication key that is used to authenticate the owner of the mobile end user device. Additionally, the SIM card includes a processor, memory, and security circuits.

Figure 7:
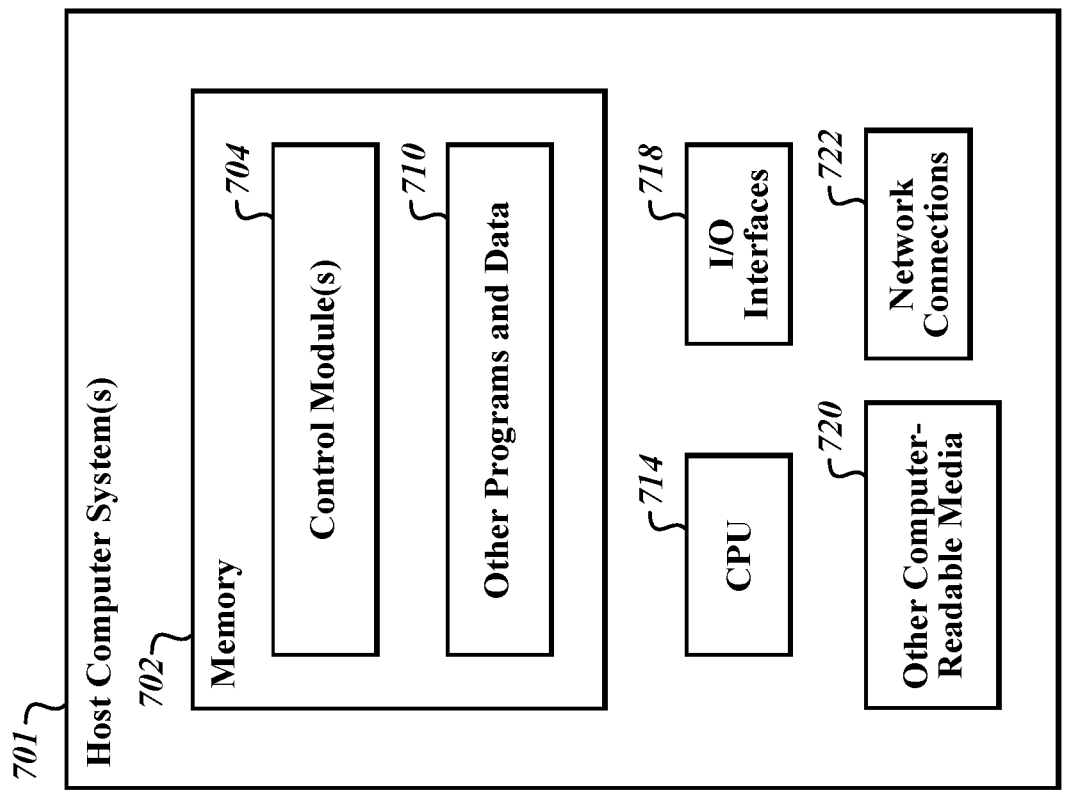
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein for a 5G PRB blanking system with 5G end user mobile devices to prevent interference with satellite signal transmission, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 701. For example, such computer system(s) 701 may represent those in various data centers and cell sites shown and/or described herein that host the functions, components, microservices and other aspects described herein to implement a 5G PRB blanking system with 5G end user mobile devices to prevent interference with satellite signal transmission. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for a 5G PRB blanking system with 5G end user mobile devices to prevent interference with satellite signal transmission. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interface, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for 5G Physical Resource Block (PRB) blanking system with 5G end user mobile devices to prevent interference with satellite signal transmission, the method comprising:
   providing, by a mobile network operator, a distributed unit (DU) of a fifth-generation (5G) cellular telecommunication network radio access network (RAN) that is served by a particular 5G cellular site base station, wherein the DU:
      is associated with a primary 5G Node B (gNB) identified by a primary identifier (ID), wherein the primary gNB are a distributed collection of base stations; and
      is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
   configuring a 5G network to enable reversing an original direction of transmission upon request from a 5G end user mobile device, wherein the original direction of transmission is from a satellite to a 5G Core to a 5G base station to a 5G end user mobile device;
   receiving a request to use a specified frequency at a specified time to communicate with the satellite;
   enabling the base station to stop download transmissions on specified frequency tones at the specified time;
   creating frequency notches at the specified time that are available for a 5G end user mobile device to upload to the satellite; and
   facilitating upload transmissions from a 5G end user mobile device to the satellite in the frequency notches at the specified time.

2. The method of claim 1 further comprising: scheduling mini-slot-based uplink transmissions from a 5G end user mobile device in an Uplink Pilot Time Slot region of a subframe.

3. The method of claim 1, further comprising: using Orthogonal Frequency Division Multiplexing (OFDM) to mitigate interference between uplink signals of the 5G end user mobile device and downlink signals from the satellite.

4. The method of claim 1, wherein the receiving of the request to use the specified frequency at the specified time to communicate with the satellite is made by a 5G Core, a 5G base station, or a 5G end user mobile device.

5. The method of claim 1, further comprising: requesting a base station in the primary gNB to reverse a direction of transmission.

6. The method of claim 1, further comprising: providing dynamic 5G PRB blanking reconfiguration of frequency notches.

7. The method of claim 1, wherein the primary gNB configures Bandwidth Parts to optimize the 5G network for the frequency notches used for the 5G end user mobile device to upload to the satellite.

8. A system for 5G Physical Resource Block (PRB) blanking system with 5G end user mobile devices to prevent interference with satellite signal transmission, the system comprising:
   a memory that stores computer executable instructions; and
   a processor that executes the computer-executable instructions and causes the processor to:
      provide, by a mobile network operator, a distributed unit (DU) of a fifth-generation (5G) cellular telecommunication network radio access network (RAN) that is served by a particular 5G cellular site base station, wherein the DU:
         is associated with a primary 5G Node B (gNB) identified by a primary identifier (ID); and
         is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
      configure a 5G network to enable reversing an original direction of transmission upon request from a 5G end user mobile device, wherein the original direction of transmission is from a satellite to a 5G Core to a 5G base station to a 5G end user mobile device;
      receive a request to use a specified frequency at a specified time to communicate with the satellite;
      enable the base station to stop download transmissions on specified frequency tones at the specified time;
      create frequency notches at the specified time that are available for a 5G end user mobile device to upload to the satellite; and
      facilitate upload transmissions from a 5G end user mobile device to the satellite in the frequency notches at the specified time.

9. The system of claim 8, wherein mini-slot-based uplink transmissions are scheduled from a 5G end user mobile device in an Uplink Pilot Time Slot region of a subframe.

10. The system of claim 8, wherein Orthogonal Frequency Division Multiplexing (OFDM) is used to mitigate interference between uplink signals of the 5G end user mobile device and downlink signals from the satellite.

11. The system of claim 8, wherein the receiving of the request to use the specified frequency at the specified time to communicate with the satellite is made by a 5G Core, a 5G base station, or a 5G end user mobile device.

12. The system of claim 8, wherein the processor that executes the computer-executable instructions further causes the processor to: request a base station in the primary gNB to reverse a direction of transmission.

13. The system of claim 8, wherein the system includes dynamic 5G PRB blanking reconfiguration of frequency notches.

14. The system of claim 8, wherein the primary gNB configures Bandwidth Parts to optimize the 5G network for the frequency notches used for the 5G end user mobile device to upload to the satellite.

15. A non-transitory computer-readable storage medium having computer-executable instructions stored thereon that, when executed by a processor, cause the processor to:
provide, by a mobile network operator, a distributed unit (DU) of a fifth-generation New Radio (5G) cellular telecommunication network radio access network (RAN) that is served by a particular 5G cellular site base station, wherein the DU:
is associated with a primary 5G Node B (gNB) identified by a primary identifier (ID); and
is in operable communication with a corresponding primary central unit control plane (CU-CP) of a 5G primary centralized unit (CU) that is hosted on a cloud-native virtualized compute instance in a primary cloud availability zone and is also associated with the primary gNB identified by the primary ID;
configuring a 5G network to enable reversing an original direction of transmission upon request from a 5G end user mobile device, wherein the original direction of transmission is from a satellite to a 5G Core to a 5G base station to a 5G end user mobile device;
requesting to use a specified frequency at a specified time to communicate with the satellite;
enabling the base station to stop download transmissions on specified frequency tones at the specified time;
creating frequency notches at the specified time that are available for a 5G end user mobile device to upload to the satellite; and
facilitating upload transmissions from a 5G end user mobile device to the satellite in the specified notches at the specified time.

16. The non-transitory computer-readable storage medium of claim 15, wherein the computer-executable instructions, when executed by a processor, further cause the processor to: schedule mini-slot-based uplink transmissions from a 5G end user mobile device in an Uplink Pilot Time Slot region of a subframe.

17. The non-transitory computer-readable storage medium of claim 15, wherein the computer-executable instructions, when executed by a processor, further cause the processor to: use Orthogonal Frequency Division Multiplexing (OFDM) to mitigate interference between uplink signals of the 5G end user mobile device and downlink signals from the satellite.

18. The non-transitory computer-readable storage medium of claim 15, wherein the computer-executable instructions, when executed by a processor, further cause the processor to: request a base station in the primary gNB to reverse a direction of transmission.

19. The non-transitory computer-readable storage medium of claim 15, wherein the system includes dynamic 5G Physical Resource Block (PRB) blanking reconfiguration of frequency notches.

20. The non-transitory computer-readable storage medium of claim 15, wherein the primary gNB configures Bandwidth Parts to optimize the 5G network for the frequency notches used for the 5G end user mobile device to upload to the satellite.

* * * * *